United States Patent [19]

Seha

[11] 4,349,478

[45] Sep. 14, 1982

[54] PROCESS FOR THE CARBAZOLATION OF ANTHRIMIDES

[75] Inventor: Zdenek Seha, Basel, Switzerland

[73] Assignee: Ciba-Geigy AG, Basel, Switzerland

[21] Appl. No.: 310,576

[22] Filed: Oct. 9, 1981

[30] Foreign Application Priority Data

Oct. 14, 1980 [CH] Switzerland .......................... 7651/80

[51] Int. Cl.$^3$ ............................................ C07D 209/86
[52] U.S. Cl. ................................................ 260/316
[58] Field of Search .......................................... 260/316

[56] References Cited

U.S. PATENT DOCUMENTS 2,416,931  3/1947  Lecher et al. ...................... 260/316

OTHER PUBLICATIONS

Vewkatramen, *The Chemistry of Synthetic Dyes*, vol. II, (1952), pp. 900–904.

Primary Examiner—Robert W. Ramsuer
Attorney, Agent, or Firm—Joseph G. Kolodny

[57] ABSTRACT

There is described a process for producing vat dyes by carbazolation of anthrimides effected by reaction of a complex of titanium tetrahalide (chloride or bromide) with a sulfone in a medium of the sulfone as the solvent. Further subject matter of the invention is a single-vessel process, in which both the production of the anthrimide and the cyclisation thereof can be performed, without isolation of an intermediate, in a sulfone as the reaction medium.

10 Claims, No Drawings

PROCESS FOR THE CARBAZOLATION OF ANTHRIMIDES

The invention relates to a process for producing vat dyes based on diphthaloylcarbazoles by carbazolation of anthrimides effected by reaction of a complex of titanium tetrahalides (chlorides or bromides) with a sulfone in a medium of the sulfone as the solvent.

Derivatives of diphthaloylcarbazoles form one of the main classes of vat dyes. They have in general good coloristic properties, and a wide range of shades from yellow and orange-yellow through brown and olive-brown to grey, to khaki and to black. They are produced by the so-called carbazolation of anthrimides, a term which, in dyestuff chemistry, is employed for the dehydrocyclisation of secondary amines of the anthraquinone series, combined with the formation of a 5-membered nitrogen-containing heterocycle. The carbazolation can be performed essentially with three agents: with sulfuric acid, metal halides or alkali metal hydroxides, whereby each of these agents has its own specific properties and effects, which as a rule are determined by the constitution of the starting substances.

Of the metal halides, aluminum chloride in particular is of outstanding importance in industrial practice. It is used either in the form of a melt together with sodium chloride, or in the form of a solution in organic bases (principally pyridine) [cp. for example FIAT 1313II, 181 and G.B. Patent Specification No. 585,798].

The use too of titanium tetrachloride for carbazolation has occasionally been mentioned in the literature. In the U.S. Pat. No. 2,416,931, there is described for example the use of titanium tetrachloride (or titanium tetrabromide, zirconium tetrachloride and zirconium tetrabromide) for carbazolation or anthrimides.

The production process consists in heating a suspension of anthrimides in an excess of titanium tetrachloride, or better still in a solution of titanium tetrachloride in an inert solvent (as a rule halogen derivatives of benzene) at temperatures of 100°–200° C. As primary products are obtained complex compounds of the formed diphthaloylcarbazole derivatives with the employed metal halides, which have to be isolated and further processed by various procedures into the dye end-products.

These two metal halide methods have the disadvantage that they involve a considerable amount of labour, time and material. Furthermore, the reaction proceeds, in the above-mentioned solvents, during the whole reaction time in an inhomogeneous phase. Attempts have been made to offset this disadvantage by for example various variants with regard to the dosing of the reactants. Successive dosing of a component into the second component renders possible a practical carrying out of the reaction under operating conditions, but does have some disadvantages. The very rapid progress of the actual carbazolation after a long pre-reaction phase results in the presence in the reaction mixture, virtually right from the commencement of the reaction, of a certain, continuously increasing proportion of the product alongside the incompletely reacted substrate, this occurring under the comparatively drastic conditions created by a high temperature and the presence of metal halides. These factors lead to the formation of undesirable by-products, which on the one hand worsen the quality of the required product and on the other hand reduce the yield thereof.

All these disadvantages are however eliminated by the novel process of the invention, since in this case the titanium tetrahalide is used in the complexed form, which ensures a constant and complete course of reaction.

The invention thus relates to a process for the intramolecular carbazolation of anthrimides, which process comprises carrying out the carbazolation reaction by means of a titanium tetrahalide/sulfone complex in an excess of the sulfone as the reaction medium.

The reaction proceeds according to the following reaction pattern:

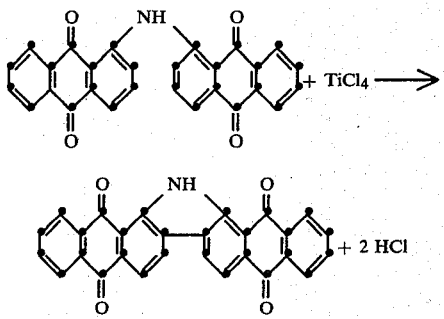

The starting materials used can be both unsubstituted di- and polyanthrimides (for example 1,1'- or 1,2'-dianthrimide, 1,1',4,1''- or 1,1',5,1''-trianthrimide, or 1,1',4,1'',4'',1'''-tetraanthrimide) as well as derivatives thereof (for example alkyl, alkoxy, halogen or acylamino derivatives). The unsubstituted compounds are preferred.

The di- and polyanthrimides are obtained, using known processes, from the corresponding amino- and halo-anthraquinones (cp. for example K. Venkataraman "The Chemistry of Synthetic Dyes," Vol. II, 893–6, Academic Press, New York, 1952).

Although the condensation reaction has hitherto been performed in boiling nitrobenzene or melted naphthalene, it has now been shown that, surprisingly, also sulfones are suitable as a reaction medium for this step carried out prior to cyclisation. The use of sulfones renders it moreover possible to perform both reactions in a single-vessel process, so that isolation of the firstly formed anthrimide from the reaction mixture is unnecessary.

Subject matter of the invention is therefore also a process for producing carbazole derivatives of the anthraquinone series, in which process mono- or diaminoanthraquinones or mono- or diaminoanthrimides as starting materials are reacted with haloanthraquinones in a sulfone, as the reaction medium, to form the corresponding di-, tri- or polyanthrimides, which are then cyclised in the same reaction medium without intermediate isolation.

The condensation of the mono- or diaminoanthraquinones or -anthrimides (preferably those in which the amino group is in the α-position) with haloanthraquinones (these are preferably the 1-chloro-, 1-bromo- and 1-iodoanthraquinones) is performed in the presence of an acid-binding agent and of a Cu-II salt. Suitable acid-binding agents are for example alkali metal carbonates, preferably sodium carbonate, and a Cu-II salt which can be used is for example basic Cu-II acetate. The condensation reaction is performed at a temperature of between 150° to 250° C.

The following may be mentioned as sulfones with which titanium tetrahalides form complexes, and which at the same time serve as solvent for these complexes, and also as reaction medium:

low-molecular sulfones of the formula $$R_1-SO_2-R_2 \text{ or}$$

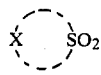

wherein $R_1$ and $R_2$ are each a straight-chain or branched-chain alkyl group having 1–4 C atoms, and X is a straight-chain or branched-chain hydrocarbon chain which has 4 to 10 C atoms and which is unsubstituted or substituted by halogen; dialkylsulfones: dimethyl-, methylethyl-, diethyl-, methyl-n-propyl-, methylisopropyl-, methyl-n-butyl-, ethylisobutyl-, diisopropylsulfone, and so forth; and alkenylsulfones: tetramethylene-, 3-methyltetramethylene-, pentamethylene-, hexamethylenesulfone, and so forth.

Preferred sulfones are tetramethylenesulfone and dimethylsulfone.

The sulfone is used preferably in the 1.5- to 5-fold amount by weight, relative to the amount of anthrimide being reacted. In the case of the single-vessel reaction, the sulfone is used in the 5- to 20-fold amount by weight, relative to the amino component.

A suitable titanium tetrahalide is titanium tetrabromide, preferably however titanium tetrachloride. The required amount of titanium tetrahalide is between 1.2 and 3.5 mols per formed carbazole ring, relative to 1 mol of anthrimide. The reaction temperature is between 60° and 180° C., with reaction times of several minutes to several hours, depending on the substrates used. The hydrogen chloride being released during the reaction (2 mols per carbazole ring) is absorbed by means of sodium hydroxide solution. After completion of the reaction, the reaction mixture is diluted with water or dilute hydrochloric acid; the crude dye obtained is filtered off, washed until neutral, and subsequently treated in an aqueous suspension with sodium hypochlorite at 80°–90° C. The oxidative after-treatment can however also be performed directly in the reaction mixture before further processing. Dyes conforming to the type are obtained by both processes in practically quantitative yields.

The employed sulfone (mainly tetramethylenesulfone) can be regenerated and recyclised in a simple manner. The reaction can be carried out in the customary stirring apparatus (stirrer vessel, Venleth) or in continuously operating reactors. The Examples which follow illustrate in detail the procedure of the novel process.

Compared with relevant processes of the prior art, the novel process of the present invention offers the following advantages:

higher product yield (in most cases virtually quantitative),
lower reaction temperatures,
shorter reaction times,
more intensive operating procedure (higher space-time yields),
simpler processing (employed solvents are miscible with water),
purer products after a simple treatment with sodium hypochlorite solution (shorter reaction times),
suitability for continuous mode of operation,
solvents are nontoxic [for example tetramethylenesulfone $LD_{50}$ (mouse, oral) 2500 mg/kg]
solvents are regenerated and recyclised by simple means,
ecologically safe waste products: NaCl, $TiO_2$; with regard to the single-vessel process:
simple procedure for performing the reaction,
shorter reaction time, and
very good yields.

In the following Examples, 'parts' are parts by weight.

EXAMPLE 1

Under a gentle stream of nitrogen, 30.1 parts of 1,1'-dianthrimide are suspended in 100 parts of tetramethylenesulfone at about 40° C., and 20.9 parts of titanium tetrachloride are added in the course of 10 minutes, during which time the temperature rises to about 60° C. The suspension is subsequently heated to 100° C., whereupon the separation of hydrogen chloride commences and the temperature slowly rises to about 105° C. The hydrogen chloride being liberated is passed into sodium hydroxide solution and absorbed, the amount of HCl, split off being measured. The reaction has finished after 1 hour, and the reaction mixture is cooled to about 90° C. There are then added dropwise, with stirring, 150 parts of water; and the reaction product is filtered off hot and washed with 200 parts of hot water (in 2 portions). This filtrate (mother liquor + washing water) is used for regenerating tetramethylenesulfone. The suction-filter residue is washed with 150 parts of hot dilute hydrochloric acid (about 10%), and afterwards washed neutral with hot water. The moist filter residue is suspended in about 400 parts of water, and then treated at about 85° C. with 100 parts of sodium hypochlorite (about 13%), which is added portionwise. After a reaction time of 1.5 hours, the reaction mixture is filtered off hot, and washed with hot water, with dilute hydrochloric acid and subsequently with hot water until neutral. In this manner is obtained, in quantitative yield, a very pure dye of the following formula

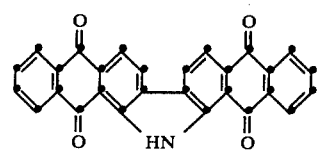

Regeneration of tetramethylenesulfone

To the mother liquor + washing water is added sodium hydroxide solution in an amount sufficient to give about a 10–15% NaOH concentration. A suspension of sodium titanate is formed and tetramethylenesulfone precipitates. The mixture is heated to 80° C., and the separated tetramethylenesulfone is taken up in 100 parts of toluene. The organic layer is separated (optionally filtered clear with active charcoal); the toluene is distilled off under a water-jet vacuum, and the temperature is finally held at 90° C. for 30 minutes. The regenerated tetramethylenesulfone remaining behind (at least 85% of the employed amount) can be used again in the same reaction.

EXAMPLE 2

Under a gentle stream of nitrogen, 97.5 parts of 1,1',5,1''-trianthrimide are suspended in 180 parts of tetramethylenesulfone at about 40° C., and 97 parts of titanium tetrachloride are added during 15 minutes, in the course of which the temperature rises to about 100° C. The suspension is subsequently heated to 145° C.; the hydrogen chloride being liberated is passed into sodium hydroxide solution, absorbed and measured. The reaction is finished after 1 hour, and the reaction mixture is cooled to about 90° C. There are then added, with stirring, 300 parts of water; the reaction product is filtered off hot, and washed with 300 parts (in 2 portions) of hot water. The tetramethylenesulfone is regenerated from this filtrate in the manner described in Example 1. The suction-filter residue is now washed with hot dilute hydrochloric acid and with hot water until neutral. The moist filter residue is suspended in 600 parts of water, and at 85° C. is treated with a total of 700 parts of sodium hypochlorite (13%)—reaction time 4 hours. The reaction mixture is afterwards filtered off hot, washed with hot water, with hot dilute hydrochloric acid and finally with hot water until neutral. The resulting dye of the formula

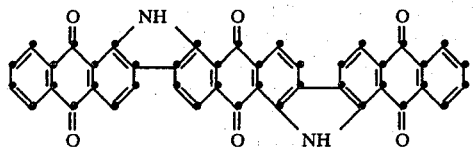

is very pure and the yield is 96% of theory.

By way of example, the advantages of the novel process are again to be emphasised at this stage by a comparison of data relating to the process at present most widely practiced, namely that described in FIAT 1313 II, 181-4, with that relating to the novel process of the invention according to Example 2.

The relevant data in connection with the carbazolation of 1,1',5,1''-trianthrimide are summarised in the Table which follows:

| FIAT 1313 II, 181 | | Present process | | |
|---|---|---|---|---|
| employed substrates in kg | | | | |
| AlCl₃ | 5.8 | sulfone | 2.0 | (of which about 1.7 is recovered by regeneration) |
| NaCl | 1.1 | | | |
| | | TiCl₄ | 1.0 | |
| HCl | 5.51 | HCl | 3.0 | |
| NaOH | 1.0 | NaOH | 3.0 | |
| NaOCl | 4.0 | NaOCl | 7.0 | |
| anthrimide | 1.21 | anthrimide | 1.05 | |
| product yield | | | | |
| 82.5% | | 96% | | |
| reaction time at | | | | |
| 150-175° C. | 12 h | 145° C. | 1 h | |
| application of sodium hypochlorite solution | | | | |
| 10-12 h | | 4 h | | |

This comparison demonstrates again the superiority of the novel process with regard to use of material, product yield and expenditure of time.

EXAMPLE 3

Under a gentle stream of nitrogen, 100 parts of dimethylsulfone are heated to about 80° C., and 32 parts of titanium tetrachloride are added, in the course of which the temperature rises to about 110° C. To this solution are added 32.5 parts of 1,1',5,1''-trianthrimide, and the temperature is raised to 145° C. Hydrogen chloride is then liberated, and is passed into sodium hydroxide solution, absorbed and measured. The reaction is complete after one hour, and the reaction mixture is cooled to 90° C. There are subsequently added dropwise, with stirring, 150 parts of water; the reaction product is filtered off hot, washed with dilute hydrochloric acid and then with hot water until neutral. The moist suction-filter residue is suspended in 300 parts of water, and is treated at 85° C. with a total of 200 parts of sodium hypochlorite (13%)—reaction time 4 hours. The reaction product is then filtered off, and washed with hot water, with hot dilute hydrochloric acid and with hot water until neutral. In this manner is obtained a very pure dye of the above formula in a yield of 95% of theory.

EXAMPLE 4

Under a gentle stream of nitrogen, 32.5 parts of 1,1',4,1''-trianthrimide are suspended in 150 parts of tetramethylenesulfone at 40° C., and 32 parts of titanium tetrachloride are added within 10 minutes, during which time the temperature rises to 60° C. The temperature is subsequently raised to 80° C., and the hydrogen chloride then being liberated is fed into sodium hydroxide solution, absorbed and measured. The reaction is finished after 1 hour; the reaction mixture is afterwards diluted with 200 parts of water, the reaction product is filtered off hot, washed with hot dilute hydrochloric acid and with hot water until neutral. The moist suction-filter residue is suspended in 400 parts of water, and at 85° C. it is treated with a total of 200 parts of sodium hypochlorite (13%)—reaction time 4 hours. The reaction product is subsequently filtered off hot, washed with hot dilute hydrochloric acid and with hot water until neutral. The resulting dye of the following formula is very pure and the yield obtained is quantitative.

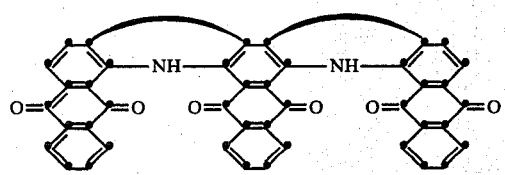

EXAMPLE 5

Under a gentle stream of nitrogen, 34.8 parts of 1,1',4,1'',4'',5''-tetraanthrimide-3',2''-carbazole are suspended in 100 parts of tetramethylenesulfone at 40° C., and 29 parts of titanium tetrachloride are added within 10 minutes, in the process of which the temperature rises to 60° C. The temperature is subsequently raised to 140° C., and the hydrogen chloride being liberated is passed into a sodium hydroxide solution, absorbed and measured. The reaction is complete after 1 hour, and the reaction mixture is cooled to 90° C., and at this temperature 150 parts of water are added dropwise. The suspension is filtered off, washed with hot dilute hydrochloric acid and with hot water until neutral. The moist suction-filter residue is suspended in 400 parts of water, and at 85° C. is treated with a total of 250 parts of sodium hypochlorite (13%)—reaction time 4 hours. The reaction product is subsequently filtered off hot, washed with hot dilute hydrochloric acid and with hot water until neutral. In this manner is obtained, in quantitative yield, a very pure dye of the formula

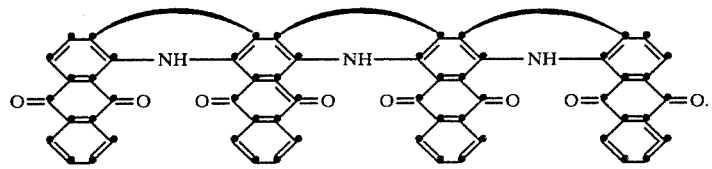

EXAMPLE 6

Under gentle stream of nitrogen, 11.2 parts of 1-aminoanthraquinone, 12.4 parts of 1-chloroanthraquinone 1 part of copper(II)-carbonate(basic) and 4 parts of sodium carbonate are suspended in 175 parts of tetramethylenesulfone; the suspension is then heated to 200° C. and held for 3 hours at this temperature, the reaction water being continuously distilled off. After cooling of the suspension to about 60° C., 28.5 parts of titanium tetrachloride are added, and the suspension is heated to about 115° C. The hydrogen chloride being liberated is absorbed in sodium hydroxide solution, and the course of the reaction thus controlled. The carbazolation is finished after about 1½ hours. The reaction mixture at about 80° C. is diluted with dilute sulfuric or hydrochloric acid, the reaction product is filtered off hot and washed neutral. The employed tetramethylenesulfone can be regenerated from the mother liquor and subsequently used again (cp. Example 1). The moist suction-filter residue is then treated in a known manner with sodium hypochlorite. The dye of the formula given in Example 1 is thus obtained in a yield of 92% of theory (relative to 1-aminoanthraquinone).

EXAMPLE 7

Under a gentle stream of nitrogen, 11.9 parts of 1,5-diaminoanthraquinone, 24.8 parts of 1-chloroanthraquinone, 1.2 parts of copper(II)-carbonate (basic) and 7.9 parts of sodium carbonate are suspended in 100 parts of tetramethylenesulfone, and the suspension is heated to 200° C., the reaction water being continuously distilled off. Condensation is complete after 5 hours, and the reaction mixture is cooled to 60° C. There are subsequently added 56.9 parts of titanium tetrachloride, the temperature is raised to 145° C., and the hydrogen chloride being liberated is absorbed in sodium hydroxide solution. The reaction is finished after about 1½ hours, and further processing of the crude product is carried out as described in Example 6. In this manner is obtained the dye having the formula given in Example 2 in a yield of 88% of theory (relative to 1,5-diaminoanthraquinone).

EXAMPLE 8

Under a light stream of air, 12 parts of leuco-1,4-diaminoanthranquinone are suspended in 100 parts of tetramethylenesulfone; the suspension is then heated to about 150° C. and held for 1 hour at this temperature. After completed air oxidation, there are added, under a gentle flow of nitrogen, 24.8 parts of 1-chloroanthraquinone, 1.2 parts of copper(II)-carbonate (basic), 7.9 parts of sodium carbonate and 25 parts of tetramethylenesulfone, and the temperature is raised to 200° C., the reaction water being continuously distilled off. Condensation is finished after 2 hours, the reaction mixture being then diluted with 50 parts of tetramethylenesulfone and cooled to about 60° C. There are subsequently added 56.9 parts of titanium tetrachloride, and the temperature is raised to 115° C., the hydrogen chloride thus liberated being absorbed in sodium hydroxide solution. Carbazolation is complete after about 1.5 hours, and the reaction mixture is diluted at about 80° C. with dilute sulfuric or hydrochloric acid, and afterwards treated with sodium chlorate solution at 80° C. After oxidation has occurred, the product is filtered off hot, washed neutral and dried. In this manner is obtained the dye of the formula given in Example 4 in a yield of 96% of theory (relative to leuco-1,4-diaminoanthraquinone).

EXAMPLE 9

Under a gentle stream of nitrogen, 13.8 parts of 4,4'-diamino-1,1'-dianthrimide, 24.8 parts of 1-chloroanthraquinone, 1 part of basic copper(II)-carbonate and 4.8 parts of sodium carbonate are suspended in 125 parts of tetramethylenesulfone, and the suspension is heated to 200° C., the reaction water being continuously distilled off. Condensation is finished after 1½ hours, and the reaction mixture is cooled to about 60° C. There are subsequently added 56.9 parts of titanium tetrachloride; the temperature is raised to 110° C. and is held there for 1½ hours, the hydrogen chloride which is liberated being absorbed in sodium hydroxide solution. The reaction mixture is then cooled to 80° C., diluted with dilute sulfuric or hydrochloric acid, and subsequently treated in the known manner with sodium chlorate solution. The yield of dye of the formula given in Example 5 is 95% of theory (relative to 4,4'-diamino-1,1'-dianthrimide).

What is claimed is:

1. A process for the carbazolation of anthrimides, which process comprises carrying out the carbazolation reaction by means of a titanium tetrahalide/sulfone complex in an excess of a sulfone of the formula

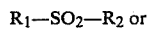

or

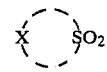

wherein
  $R_1$ and $R_2$ are each a straight-chain or branched-chain alkyl group having 1 to 4 C atoms, and
  X is a straight-chain or branched-chain hydrocarbon chain which has 4 to 10 C atoms and which is unsubstituted or substituted by halogen as the reaction medium.

2. A process according to claim 1, wherein the sulfone used is tetramethylenesulfone or dimethylsulfone.

3. A process according to claim 1, wherein the sulfone is used in the 1.5- to 5-fold amount by weight, relative to the amount of anthrimide being reacted.

4. A process according to claim 1, wherein the titanium tetrahalide used is titanium tetrachloride.

5. A process according to claim 1, wherein the titanium tetrahalide is used in an amount of 1.2–3.5 mols per formed carbazole ring, relative to 1 mol of anthrimide.

6. A process according to claim 1, wherein 1,1'- or 1,2'-dianthrimide, 1,1',4,1''- or 1,1',5,1''-trianthrimide, or 1,1',4,1'',4'',1'''-tetraanthrimide is subjected to the carbazolation reaction.

7. A process according to claim 1, wherein the cyclisation reaction is performed at a temperature of between 60° and 180° C.

8. A process according to claim 1, wherein the reaction mixture is subjected to an oxidative aftertreatment before further processing.

9. A modification of the process according to claim 1, whereby, in a single-vessel reaction with use of a sulfone as the reaction medium, a mono- or diaminoanthraquinone, or a mono- or diaminoanthrimide, is reacted, in the presence of an acid-binding agent and of a Cu(II) salt, with a monohaloanthraquinone; and the formed di- or polyanthrimide is cyclised without intermediate isolation, in the presence of a titanium tetrahalide/sulfone complex, to give the carbazole derivative.

10. A process according to claim 1, wherein the reaction is performed in continuously operating reactors.

* * * * *